(12) United States Patent
Kargilis

(10) Patent No.: US 6,260,527 B1
(45) Date of Patent: Jul. 17, 2001

(54) POWER STEERING FLUID RESERVOIR

(75) Inventor: John S. Kargilis, Northville, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/451,892

(22) Filed: Dec. 1, 1999

(51) Int. Cl.[7] ................................................ F02M 35/10
(52) U.S. Cl. .............................. 123/184.21; 123/184.42; 123/184.47; 123/184.61
(58) Field of Search ........................ 123/184.21, 184.24, 123/184.34, 184.42, 184.47, 184.61, 198 E

(56) References Cited

U.S. PATENT DOCUMENTS

| | | | |
|---|---|---|---|
| 4,497,618 | 2/1985 | Anderson et al. | 418/212 |
| 4,958,603 | 9/1990 | Heimer | 123/195 A |
| 5,050,701 | 9/1991 | Okui | 180/297 |
| 5,465,804 | 11/1995 | Malik | 180/133 |
| 5,531,194 | 7/1996 | Komatsu | 123/193.5 |
| 5,575,249 | 11/1996 | Mielke | 123/184.57 |
| 5,913,295 | * 6/1999 | Sadr et al. | 123/198 E |
| 5,947,073 | 9/1999 | Chaffin | 123/184.61 |
| 5,950,586 | * 9/1999 | Ropertz | 123/184.42 |
| 6,009,863 | * 1/2000 | Tochizawa | 123/572 |
| 6,095,105 | * 8/2000 | Lohr et al. | 123/90.38 |

* cited by examiner

*Primary Examiner*—Willis R. Wolfe
*Assistant Examiner*—Hai Huynh
(74) *Attorney, Agent, or Firm*—Lawrence J. Shurupoff

(57) ABSTRACT

A power steering fluid reservoir is provided which is formed integrally with an intake manifold. The intake manifold includes an inlet channel for allowing ambient air into the manifold. A plenum is fluidly connected with the inlet channel and the plenum provides a gaseous reservoir. A plurality of runners are fluidly connected with the plenum for distributing air to the cylinders of an engine. Integrally formed with the inlet channel, plenum, and runners is a power steering fluid reservoir. The power steering fluid reservoir is fluidly separated from the intake plenum by a common wall. The common wall allows for continuous cooling of the power steering fluid by an induced flow of ambient air through the plenum.

8 Claims, 1 Drawing Sheet

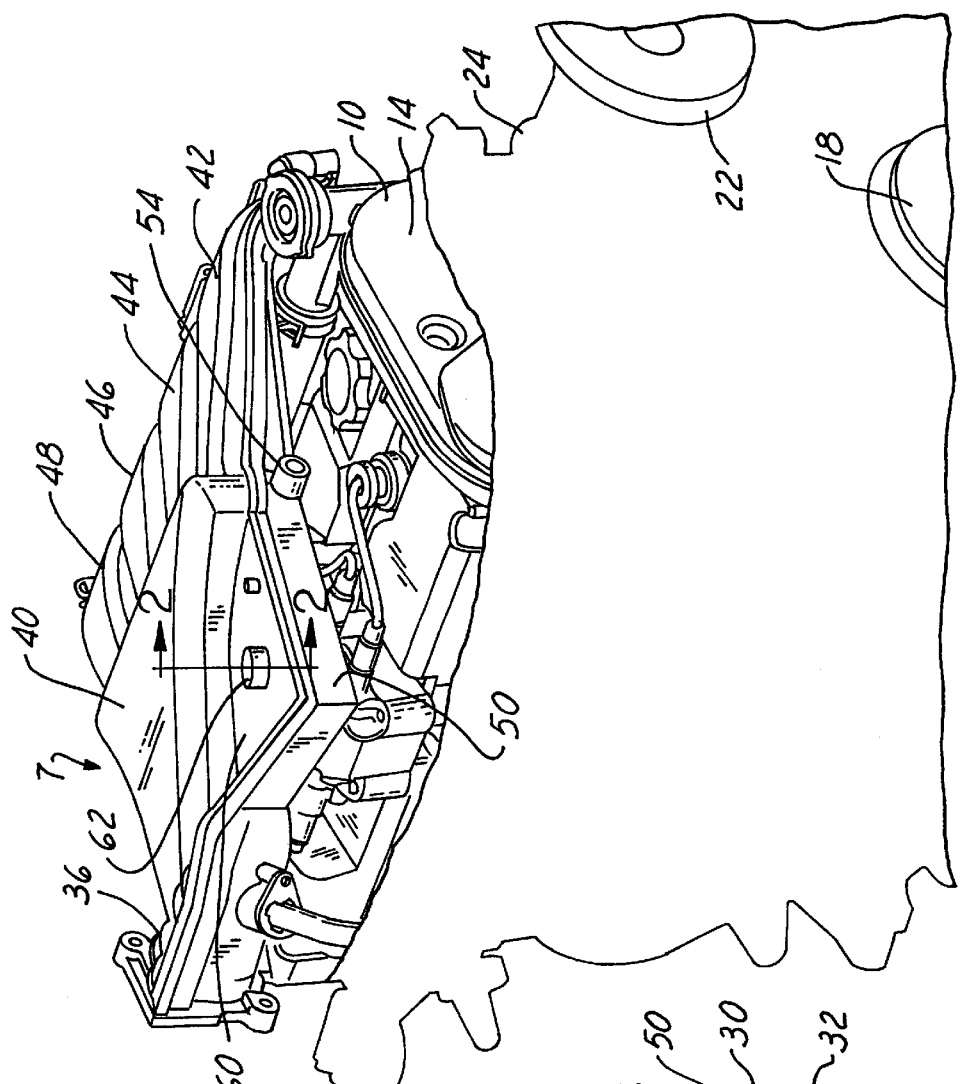
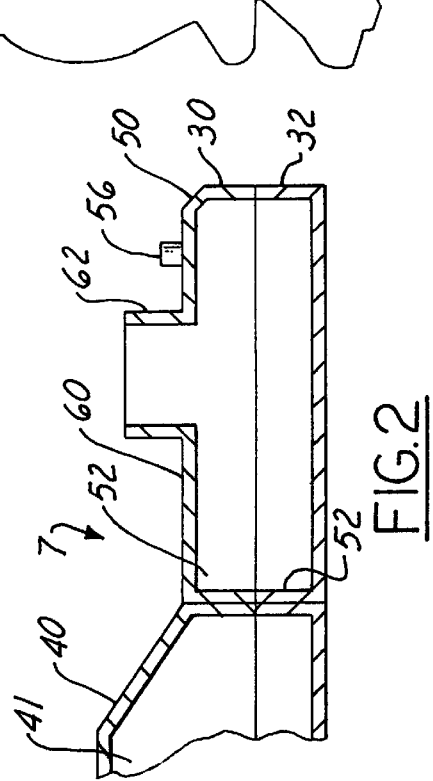

POWER STEERING FLUID RESERVOIR

FIELD OF THE PRESENT INVENTION

The present invention relates to reservoirs for holding power steering fluid and an automotive vehicle. More particularly, the present invention relates to an intake manifold with an integral power steering fluid reservoir.

In the most recent quarter century, there has been a major effort to increase fuel economy of automotive vehicles. To achieve an increase fuel economy, several technical trends have developed. The first technical trend is a change from rear wheel drive to front wheel drive vehicles. Front wheel drive vehicles tend to increase fuel economy by placing the weight of the engine over the traction wheels of the vehicle. Another technical trend to increase fuel economy is to make the vehicle lighter and smaller and to diminish its aerodynamic drag. To lower the aerodynamic drag, the hood region of many vehicles has been lowered. The front end of the vehicle is made more round or pointed instead of the box front end which was common on many prior vehicles. Additionally, the grill area is typically made smaller. The aerodynamic changes which have occurred on the front of the vehicle have resulted in a smaller volumetric space under the vehicle hood.

In front wheel drive vehicles, it is a common practice to mount the engine and transmission transverse to the major axis of the vehicle. Typically, transverse mounted vehicles require an electrically powered radiator fan rather than a radiator fan which is powered from the crankshaft of the vehicle engine. The utilization of an electric fan versus the prior crankshaft powered fans and the transverse mounting of the engine and the smaller engine compartments have all resulted in less air flow around the engine. The lower air flow around the engine has resulted in higher underhood temperatures being realized.

In prior vehicles with (in line) engines wherein the engine is positioned generally longitudinally with respect to the major vehicle axis, it is typically more convenient to place a power steering reservoir directly over a power steering pump. The power steering pump is typically also powered off of the crankshaft of the vehicle engine via a pulley and belt arrangement. However, when the engine is mounted transversely placing the power steering reservoir over the power steering pump is sometimes not possible since it is not in an accessible area to a vehicle operator who wishes to add fluid to the power steering system. To address the above-noted problems, many power steering fluid reservoirs are now remotely located from the power steering pump. Another problem which has been generated by the higher underhood temperatures is that in certain locations the power steering fluid can become too hot and degrade or not function properly. Therefore, an automotive designer must look for a cool spot under the hood to place the power steering reservoir. Often the cool spot is not in an area which is readily accessible to a vehicle operator. The further the cool spot is from the power steering pump, the greater is cost for the hose routing between the reservoir and the power steering pump inlet. The cost of a hose between the power steering reservoir and the steering gear actuator outlet must also be considered. Additionally, there is additional costs which are generated by the mounting fixture which will hold the power steering fluid reservoir in its desired location.

In certain premium vehicles with very high powered engines, the temperature under the hood can get so hot that the power steering fluid must have its own separate cooler which further adds to the expense of the vehicle.

It is desirable to provide a power steering reservoir which can minimize the length hoses between the power steering reservoir and the power steering pump and power steering actuator. It is also desirable to provide a power steering reservoir which is easily accessible for maintenance by the vehicle operator. It is also desirable to provide a power steering reservoir which aids the lowering of the temperature of the power steering fluid even in a hot engine compartment environment.

SUMMARY OF THE INVENTION

To make manifest the above-noted and other desires, the revelation of the present invention is brought forth. The present invention brings forth the freedom of providing a power steering fluid reservoir which is formed integrally with the intake manifold of the vehicle. In a preferred embodiment, the present invention provides a vehicle intake manifold which has an inlet channel for allowing ambient air into the manifold. A plenum is fluidly connected with the inlet channel and the plenum provides a gaseous reservoir. A plurality of runners are fluidly connected with the plenum for distributing air to the cylinders of the engine. Integrally formed with the inlet channel, plenum, and runners is a power steering fluid reservoir. The power steering fluid reservoir is fluidly separated from the intake plenum by a common wall. The common wall allows for continuous cooling of the power steering fluid by the induced flow ambient air which is in almost all occasions cooler than the underhood temperature of the vehicle.

It is the object of the present invention to provide a power steering reservoir which is integrally formed with an engine intake manifold of a vehicle.

It is an object of the present invention to provide a power steering fluid reservoir which is integral with the engine intake manifold of the vehicle and is cooled by ambient air passing through the intake manifold.

The above noted and other objects of the present invention would become apparent to those skilled in the art from a review of the invention as it is provided in the accompanying drawings and detailed description of the preferred embodiment.

BRIEF DESCRIPTION OF THE DRAWINGS

FIG. 1 illustrates a perspective view engine intake manifold 7 of the present invention in the environment of an automotive engine compartment with the body portions of the vehicle being removed for clarity of illustration.

FIG. 2 is a view taken along line 2—2 of FIG. 1.

DETAILED DESCRIPTION OF THE PREFERRED EMBODIMENT

In FIG. 1, the engine 10 and the accompanying transmission (not shown) are transversely mounted within the engine compartment. The engine 14 has an engine block with four in line cylinders (not shown). Pistons (not shown) pivotally connected with a crankshaft are mounted within the cylinders. Via sequence explosions of the fuel (typically gasoline) within the cylinders, the pistons driveably power a crankshaft (not shown). The crank shaft which has one end connected with a transmission (not shown) input shaft of the vehicle. An opposite end of the crank shaft is connected with a drive pulley 18. The drive pulley 18 via belt (not shown) powers a pulley 22 which powers the power steering pump 24. Power steering pump 24 (shown in outline only) which is a gear type pump supplies pressurized fluid commonly referred to as the power steering fluid to an actuator commonly referred to as the steering gear (not shown).

Towards a forward end of the engine and on top of the engine block there is provided an intake manifold 7. The intake manifold 7 may be a molded metallic member or may be made as is common in the industry today of a molded polymeric material. In the example shown, the material utilized is a nylon plastic material typically supplied by Dupont of Troy, Mich. The nylon material can withstand temperatures of 300° F. and typically will be injection molded with a 2 to 3 millimeter wall thickness. As shown, the manifold 7 has a clam shell type construction with upper and lower halves 30, 32 which are sonically or vibration welded together.

The manifold 7 has an inlet channel 36. The inlet channel is connected with an outlet of an air filter (not shown). Typically, the inlet channel will have a three square inch opening. Fluidly connected with the inlet channel is a plenum 40. The plenum 40 supplies a gaseous reservoir typically having a volume 1.2× the displacement of the engine. Typically, the temperature underneath the hood of the vehicle within the engine compartment is from 100 to 350 degrees F. Typically, the ambient air within the plenum varies from 0 to 110 degrees F. Fluidly connected with the plenum are a series of four runners 42, 44, 46 and 48. The runners 42, 44, 46 and 48 are formed in such a manner that attempt to provide an even gas flow through each engine cylinder with equal conditions of volumetric flow rate and pressure.

Referring additionally to FIG. 2, formed integrally with the manifold inlet channel 36, plenum 40 and runners 42, 44, 46 and 48 is a power steering reservoir 50. The power steering reservoir 50 is fluidly separated from the remainder of the intake manifold. However, the power steering reservoir 50 shares a common wall 52 (FIG. 2) with the plenum 40 and heat transfer occurs across this common wall 52. The heat transfer which occurs across the common wall, allows the power steering fluid to stay cooler. Typically, the power steering reservoir will be large enough to contain 50 cubic in. of power steering fluid.

The power steering reservoir has a fluid supply outlet nipple 54 which is connected by a hose (not shown) to the power steering pump 24. The power steering gear actuator has a fluid outlet which is connected by a hose (not shown). The power steering gear fluid return hose (not shown) is connected to an inlet nipple 56 of the power steering reservoir.

Also along the top surface 60 of the power steering reservoir 50, there is a fill passage 62. The fill passage is typically threaded and will have connected thereto a vented cap similar or identical to those already provided for power steering reservoirs. The power steering reservoir top surface 60 is at a slightly lower elevation below that of the top surface 41 of the plenum to allow for the vertically upward projection of the fill cap when it is covering up the fill passage 62.

If desired, a metallic insert (not shown) can be inserted between the common wall between the plenum and the power steering reservoir to enhance thermal transfer. Additionally (not shown) the wall of the power steering reservoir can be inserted with an translucent plastic strip to provide a fill site to alert the vehicle operator that additional power steering fluid is required.

The present inventive automotive vehicle engine intake manifold with an integral power steering reservoir has been shown in a preferred embodiment. However, it will be apparent to those skilled in the art, the various modifications can be made to the present invention without departing from the spirit or scope of the present invention as it is an encompassed in the specification and drawings and by the following claims:

What is claimed is:

1. An automotive vehicle engine intake manifold for delivering air to an automotive engine comprising:

an inlet channel for allowing ambient air into said manifold;

a plenum fluidly connected with said inlet channel for providing a gaseous reservoir;

a plurality of runners fluidly connected with said plenum for distributing air to cylinders of an engine;

a power steering fluid reservoir fluidly separated from said inlet channel, said plenum and said runners, said power steering fluid reservoir containing power steering fluid, said power steering fluid reservoir being integrally formed with said inlet channel, said plenum and said runners.

2. An automotive vehicle engine intake manifold as described in claim 1, wherein said manifold is formed from a polymeric material.

3. An automotive vehicle engine intake manifold as described in claim 2, wherein said manifold body has a clam shell construction.

4. An automotive vehicle engine intake manifold as described in claim 3, wherein said clam shells of said manifold are sonically welded together.

5. An automotive vehicle engine intake manifold as described in claim 1, wherein said power steering reservoir shares a common wall with said plenum.

6. An automotive vehicle engine intake manifold as described in claim 1, wherein said power steering fluid reservoir has an outlet, an inlet and a filling passage.

7. An automotive vehicle engine intake manifold as described in claim 1 where said power steering fluid reservoir is at a lower elevation than an upper edge of said plenum.

8. An automotive vehicle engine intake manifold for delivering air to an automotive engine, said manifold being fabricated from two claim shell of polymeric material sonically welded together said manifold comprising:

an inlet channel for allowing ambient air into said manifold;

a plenum fluidly connected with said inlet channel for providing a gaseous reservoir;

a plurality of runners fluidly connected with the plenum for distributing air to cylinders of said engine; and a power steering reservoir fluidly separated from said plenum sharing a wall in common with said plenum, and said power steering fluid reservoir includes an inlet and outlet and a filling passage.

* * * * *